(No Model.) 2 Sheets—Sheet 1.

T. H. KILLINGSWORTH.
STALK CUTTING MACHINE.

No. 365,821. Patented July 5, 1887.

Witnesses.
Robert Everitt
Geo W Rea

Inventor.
Thomas H. Killingsworth.
By James L. Norris.
Atty.

(No Model.) 2 Sheets—Sheet 2.
T. H. KILLINGSWORTH.
STALK CUTTING MACHINE.
No. 365,821. Patented July 5, 1887.
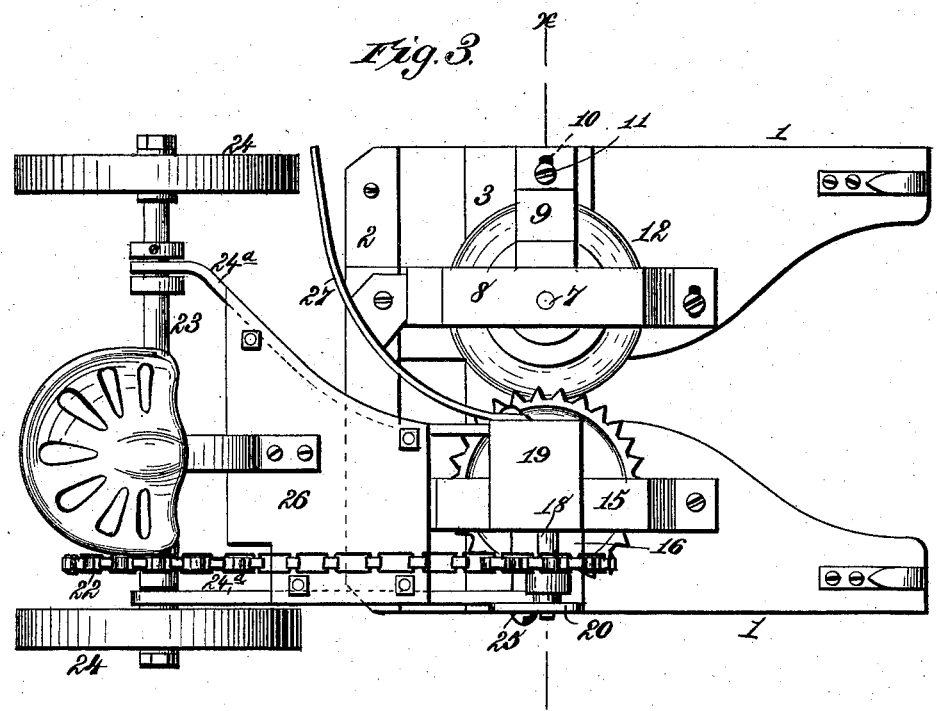
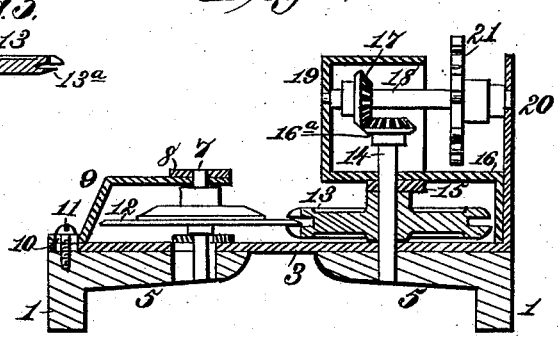
Witnesses:
Robert Everett
Geo. W. Rea
Inventor:
Thomas H. Killingsworth
By James L. Norris.
Atty.

UNITED STATES PATENT OFFICE.

THOMAS H. KILLINGSWORTH, OF WACO, TEXAS.

STALK-CUTTING MACHINE.

SPECIFICATION forming part of Letters Patent No. 365,821, dated July 5, 1887.

Application filed August 27, 1886. Serial No. 212,033. (No model.)

*To all whom it may concern:*

Be it known that I, THOMAS H. KILLINGSWORTH, a citizen of the United States, residing at Waco, in the county of McLennan and State of Texas, have invented new and useful Improvements in Stalk-Cutting Machines, of which the following is a specification.

This invention has for its object to provide a simple and efficient machine for severing corn and other stalks at or near the ground, and delivering the same laterally to one side of the machine, whereby they are cast in rows upon the ground out of the path of the ground-wheels.

The invention also has for its objects to provide novel cutting devices and means for revolving the same, and to provide novel means whereby the machine will conform or adjust itself to the surface traversed.

The objects of my invention I accomplish by the construction and combination of devices, hereinafter described and claimed, reference being made to the accompanying drawings, in which—

Figure 1:
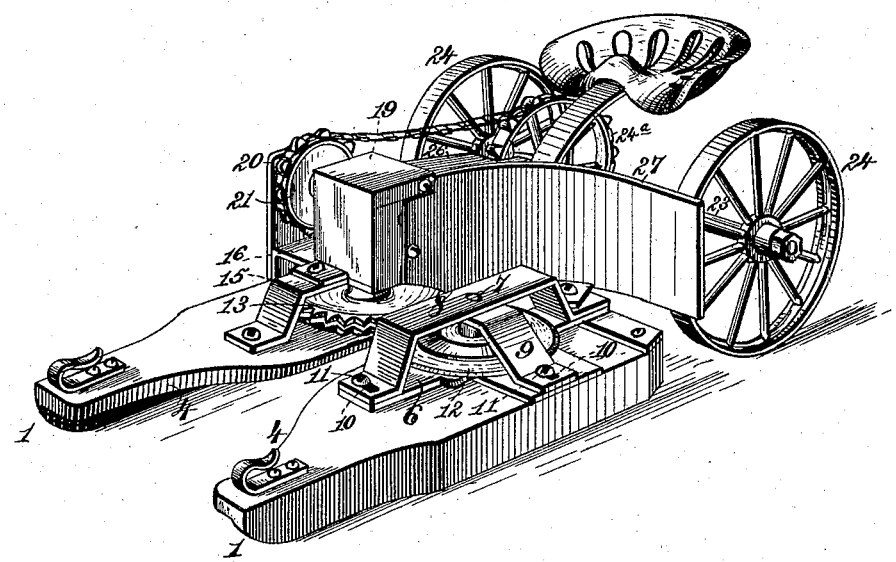
Figure 2:
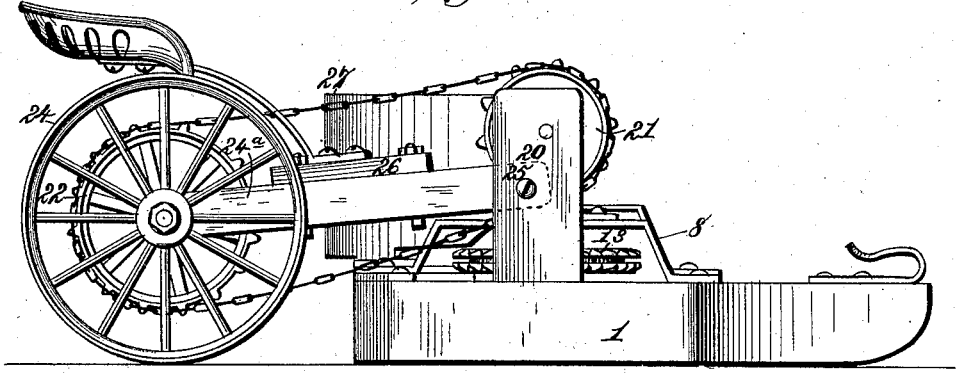

Figure 1 is a perspective view of a machine embodying my invention; Fig. 2, a side elevation of the same; Fig. 3, a top plan view; Fig. 4, a sectional view, taken centrally through the cutting-disks, on the line *x x* of Fig. 3; and Fig. 5, a detail sectional view showing a modification in the construction of the toothed wheel.

In order to enable others skilled in the art to make and use my invention, I will now describe the same in detail, referring to the drawings, wherein—

The numerals 1 1 indicate two runners adapted to slide on the ground, and rigidly connected by front and rear cross-plates, 2 and 3, with an intervening space between them for the reception and passage of the stalks and stubs. The runners diverge at their forward ends, as at 4, and are recessed longitudinally on their under sides, as at 5, to conform or adapt them to the ridge or hill. A plate, 6, extending longitudinally along one runner, affords a bearing for the lower end of a revolving shaft, 7, arranged vertically and journaled at its upper end in an arched bar, 8, and lateral inclined brace-bars 9, both of said bars having end slots, 10, through which pass adjusting-screws 11, whereby the bars and shaft can be adjusted laterally toward and from the space intervening between the two runners. The shaft 7 is free to rotate and carries an attached disk, 12, having a circular sharp cutting-edge which enters and travels in a peripheral groove formed in a circular toothed wheel, 13, mounted on a shaft, 14, journaled in the cross-plate 3, arched bar 15, and bracket 16. The circular groove in the wheel divides the toothed periphery thereof into an upper and a lower set of teeth, and this wheel, in conjunction with the disk, constitutes the rotary cutting mechanism for severing the stalks at or near the ground between the two runners. The teeth of the wheel force the stalk upon the cutting-disk, and also act to grind or break the stalk, so that it is severed rapidly and efficiently, and these cutters operate best when the resistance is greatest.

To completely sever the stalk in the most effective manner, it is important that the cutting-edge of the disk enter and travel in the circular groove of the wheel. The edge of the cutting disk can be adjusted into the groove in the wheel by adjusting the plate 6, arched bar 8, and brace 9, as before explained. The shaft 14 carries a bevel-gear, 16$^a$, at its upper end, which meshes into a bevel-gear, 17, on a horizontal shaft, 18, journaled in an upright frame, 19, and a standard, 20.

The shaft 18 is provided with a chain-wheel, 21, connected by a chain belt with a somewhat larger chain-wheel, 22, rigidly secured to the axle 23 of the ground-wheels 24, one of the latter being loose on the axle and the other fixed thereto, so that as the machine travels the axle will be rotated, and by the described gearing a positive revolving motion will be imparted to the toothed wheel 13. The cutting-disk 12 is not driven by gearing, but rotates by the force of the stalks entering between it and the toothed wheel, thereby producing a shear cut.

The axles of the ground-wheels are journaled to rotate in a rear frame consisting of two beams or bars 24$^a$, which are pivoted or hinged at their forward ends, as at 25, to the standard 20 and frame 19, respectively, whereby the runners and their adjuncts can rise and fall by turning on said pivoted connection to conform or adjust themselves to the surface traversed, while the rear frame and ground-wheels can also rise and fall on the pivots without affecting the position of the runners. As the rising motion of either the runners or the rear frame will slightly slacken the belt-connection, it is important to provide a chain belt and chain or sprocket wheels, as the toothed wheel will be thereby rotated, even if the belt slackens. The rear beams or bars, 24ª, support a platform, 26, on which is mounted a standard carrying a seat. In stalk-cutters of this character it is important to deliver the stalk laterally to the side of the machine immediately on its being severed, and to accomplish this I provide a vertical plate, 27, secured to the frame 19, and extending in a curved line across the space between the runners and across the runner carrying the cutting-disk to a point beyond the ground-wheel at that side of the machine. The plate is a deflector and curves directly in rear of the cutting-disk and wheel, and consequently, when the stalk is severed, it strikes the deflector, and by the advance of the machine is moved laterally and discharged at one side thereof, whereby the stalks may be cast in rows at the side of the machine and beyond the ground-wheels. The deflecting-plate will be of sufficient height to effect the object for which it is designed, and as it is shown as only secured at one end it may be desirable in this form to provide the lower edge of the plate with a flange, 28, bolted or otherwise secured in place to some part of one of the runners.

In operation an animal is preferably hitched to the forward end of each runner, and the latter straddle the hill or ridge of the stalks, the divergent edges of the runners properly entering the stalks to the cutting devices, which sever the stalks at or near the ground, after which the severed stalks are deflected laterally and cast on one side of the machine.

The wheel 13, instead of being divided into an upper and a lower set of teeth, may be constructed with its lower section as an annular cutting-edge, 13ª, as shown in Fig. 5, the upper section only being toothed. In this construction the lower cutting-edge, 13ª, coacts with the disk 12 in producing a shear cut, while the upper toothed section of the wheel acts to force the stalk upon the cutting-disk and also to grind or break the stalk.

Having thus described my invention, what I claim is—

1. The combination, in a stalk-cutting machine, of two separated runners, a cutting-disk journaled on one runner and a revolving wheel journaled on the other runner, and having a circular peripheral groove in which the cutting-edge of the disk is arranged to move, substantially as described.

2. The combination, in a stalk-cutting machine, of two separated runners, a horizontal revolving wheel journaled on one runner, and provided with a circular pheripheral groove, and a laterally-adjustable horizontal cutting-disk journaled on the other runner, and having its cutting-edge arranged in the groove of the wheel, substantially as described.

3. The combination, in a machine for cutting stalks, of two runners separated from each other, a toothed wheel journaled on one runner, and having a circular pheripheral groove dividing the teeth into an upper and lower set, and a circular cutting-disk journaled on the other runner, and having its cutting-edge arranged to move in the groove of the wheel, substantially as described.

4. The combination, in a machine for cutting stalks, of two runners separated from each other, two rotary horizontal cutting devices journaled, respectively, on the runners, and a vertical curved deflecting-plate secured to a part of one runner and extending across the other runner, substantially as described.

5. The combination, in a machine for cutting stalks, of two separated runners, a rear wheeled frame pivotally connected with one runner, a horizontal wheel journaled on one runner, and provided with a circular peripheral groove, a horizontal cutting-disk journaled on the other runner, and chain-wheels, a chain belt, and bevel-gear for positively revolving the grooved wheel, substantially as described.

6. The combination, in a machine for cutting stalks, of two separated runners, a rear wheeled frame pivotally connected with one runner, a horizontal rotary disk journaled on one runner, a horizontal wheel journaled on the other runner, means for revolving the wheel from the axle of the wheels of the rear frame, and a vertical curved deflecting-plate extending from one runner across the other, substantially as described.

7. The combination, in a machine for cutting cornstalks, of two separated runners, a rear wheeled frame pivotally connected with one runner, a horizontal toothed wheel having a circular peripheral groove and journaled on one runner, a circular cutting-disk journaled on the other runner, and having its cutting-edge arranged in the groove of the wheel, gearing for driving the latter wheel from the axle of the wheels of the rear frame, and a vertical curved deflecting-plate extending from one runner across the other runner, substantially as described.

8. The combination of the two separated runners, horizontal rotary cutting devices journaled, respectively, on the runners, a rear frame comprising beams pivotally connected at their forward ends with one of the runners, a wheeled axle journaled in the rear ends of the beams, a chain belt, chain-wheels, and gearing for positively revolving one cutting device, and a vertical curved deflecting-plate extending from one runner across the other runner, substantially as described.

In testimony whereof I affix my signature in presence of two witnesses.

THOMAS H. KILLINGSWORTH.

Witnesses:
MEREDITH A. SULLIVAN,
JAMES EDMONDS.